No. 824,672. PATENTED JUNE 26, 1906.
G. W. ROBERTS.
TANK INDICATOR.
APPLICATION FILED FEB. 23, 1906.
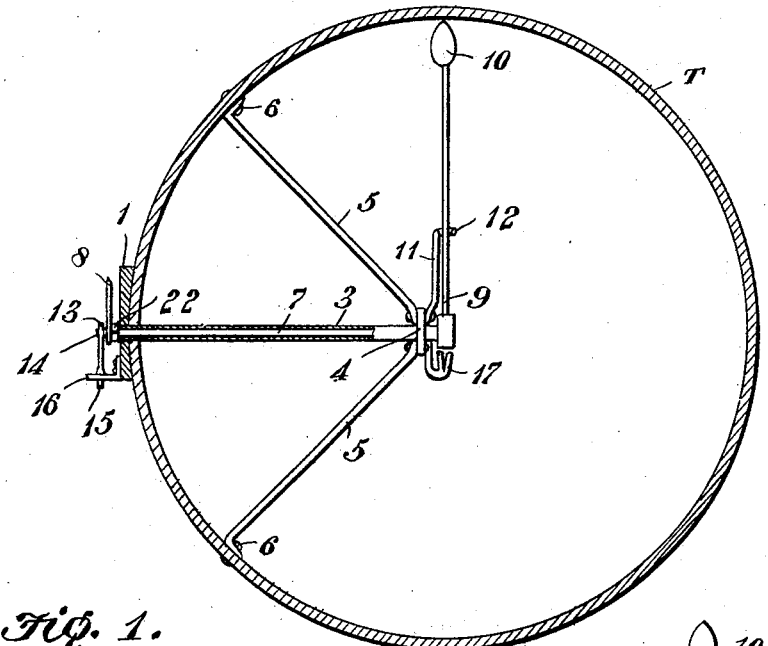
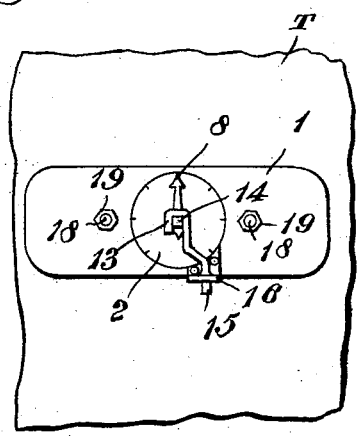
WITNESSES:
E. F. Stewart
R. M. Elliott
George W. Roberts,
INVENTOR,
By C. A. Snow & Co.
ATTORNEYS.

UNITED STATES PATENT OFFICE.

GEORGE WESLEY ROBERTS, OF LEMOORE, CALIFORNIA.

TANK-INDICATOR.

No. 824,672.  Specification of Letters Patent.  Patented June 26, 1906.

Application filed February 23, 1906. Serial No. 302,572.

*To all whom it may concern:*

Be it known that I, GEORGE WESLEY ROBERTS, a citizen of the United States, residing at Lemoore, in the county of Kings and State of California, have invented a new and useful Tank-Indicator, of which the following is a specification.

This invention relates generally to indicators, and more particularly to one adapted for use in connection with oil-tank cars to indicate whether the tank is full, or partly full, or empty, and also, if desired, to register the amount of oil contained.

In oil-fields it frequently happens that empty oil-tank cars are hauled many hundred miles to a point of destination under the impression that they are full, and also full tanks are returned to the field under the impression that they are empty.

It is the object of the present invention to obviate mistakes of this character by providing a simple and thoroughly efficient device which may be readily attached to a tank without requiring any extended change in its structural arrangement, and which will in a positive manner show whether or not the car is full or empty. Furthermore, to prevent damage to the indicator, as from jars, vibrations, and the like, when the car is in transit.

With the above and other objects in view, as will appear as the nature of the invention is better understood, the same consists in the novel construction and combination of parts of an indicator for tank-cars, as will be hereinafter fully described and claimed.

In the accompanying drawings, forming a part of this specification and in which like characters of reference indicate corresponding parts, Figure 1 is a view in vertical transverse section through a tank-car, exhibiting the indicator of the present invention combined therewith. Fig. 2 is a fragmentary detail view in elevation taken from the exterior of the car. Fig. 3 is a perspective detail view of the indicator.

Referring to the drawings, T designates the tank of an ordinary oil-car, and as this may be of the usual or any preferred construction further description thereof is deemed unnecessary. The present invention resides in a novel form of indicator for showing whether the tank is full or empty, and also, if desired, to register the amount of oil contained.

The indicator consists in part of a plate 1, that is disposed exteriorly of the tank and may be provided with a graduated scale 2 to show the amount of oil in the tank. Rigidly secured in a threaded orifice in the plate 1 is one end of a tube 3, the other end of which projects through the side of the car and is secured in a plate 4, that is held in position, as shown in Fig. 1, by brace-irons 5, that are secured to the plate 4 and to the interior of the tank at 6. Mounted within the tube and fitting snugly therein is a shaft 7, the outer end of which carries a pointer 8 to traverse the scale 2, and the inner end which projects beyond the plate 4 is squared and has rigidly secured to it one end of an arm 9, the other end of which carries a float 10, of the usual or any preferred construction.

In order to prevent the float 10 from moving through an arc of more than half of a circle, there is combined with the plate 4 a stop 11, which consists of a bar of metal having its upper end formed into a crotch 12, into which the arm will pass when it reaches a vertical position, as clearly shown in Fig. 1.

As will be obvious, when the car is in transit there will be a tendency for the float to rise and fall, and this is objectionable, as it tends to wear away the tube 3, which will allow oil to escape, and to prevent this there is a locking device consisting of a bar of metal having one end formed into a crotch or yoke 13 to straddle the squared portion 14 of the shaft 7 and a shank 15 that projects through an orificed boss or bracket 16, carried by the plate 1. It will be seen from this that so long as the crotch 14 is in engagement with the squared portion of the shaft that the float will be positively held against movement and that when the crotch is thrown out of engagement with the shaft the float will be free to move, and thus perform its functions.

When the tank is empty, the tendency of the arm 10 will be to vibrate, and to prevent this there is an approximately V-shaped spring-catch 17 provided, which depends from the plate 4 and into which the arm will enter when the float is downward; but the frictional contact between the arm and the catch will not be sufficient to hold the float against lifting when the tank is again filled.

In order to hold the plate 1 firmly secured against the tank, there are two brace-rods 18 employed, the outer ends of which project through the tank and through the plate and are held combined therewith by nuts 19, the inner ends of the rods being outturned to present toes 20, that are secured to the plate 4 by bolts 21. To hold the shaft 7 against movement relatively to the tube 3, the outer end of the said shaft adjacent to the plate 1 is threaded and has combined with it a nut 22, as clearly shown in Fig. 1.

It will be seen from the foregoing description that so long as the tank is full the arm 9 will occupy a vertical position with the float upward and that when the tank is empty the arm will also occupy a vertical position with the float downward, and these two positions of the float or any intermediate position will be indicated by the pointer 8, so that any danger of shipping a full tank for an empty one, or vice versa, will be positively prevented.

I claim—

1. A tank-indicator comprising a plate, a tube having one end rigidly secured to the plate, a second plate carried by the other end of the tube, braces connecting the plates, a shaft mounted in the tube and having its outer end provided with a pointer, a float-carrying arm rigid with the inner end of the shaft, and means for limiting the arcs of movement of the arm.

2. A tank-indicator comprising a plate, a tube having one end rigidly secured to the plate, a second plate carried by the other end of the tube, braces connecting the plates, a shaft mounted in the tube, and having its outer end provided with a pointer, means co-acting with the outer end of the shaft to lock it against rotation when desired, and a float-carrying arm rigid with the inner end of the shaft.

3. A tank-indicator comprising a plate, a tube having one end rigidly secured to the plate, a second plate carried by the other end of the tube, braces connecting the plates, a shaft mounted in the tube, and having its outer end provided with a pointer, means co-acting with the outer end of the shaft to lock it against rotation when desired, a float-carrying arm rigid with the inner end of the shaft, and means carried by the second plate to limit the movement of the arm.

4. The combination with a tank, of a plate disposed on the outer side thereof, a tube projecting through the tank and rigidly secured at its outer end to the plate, a second plate secured to the inner end of the shaft, brace-rods connecting the two plates, braces connecting the second-named plate and the tank, a shaft mounted in the tube and carrying a pointer, a float-carrying arm rigidly secured to the inner end of the shaft, means for limiting the arc of movement of the arm in both directions, means for locking the shaft against rotation, and means for preventing the shaft from having any longitudinal movement relatively to the tube.

In testimony that I claim the foregoing as my own I have hereto affixed my signature in the presence of two witnesses.

GEORGE WESLEY ROBERTS.

Witnesses:
J. W. DENTON,
ALBERT L. McKAY.